Patented Sept. 19, 1950

2,523,204

UNITED STATES PATENT OFFICE 2,523,204

COLLOIDAL SILICATE EMULSIFYING COMPOSITION

William K. Feustel, Norwalk, and Francis E. Hutchins, East Norwalk, Conn., assignors to R. T. Vanderbilt Co., Inc., New York, N. Y., a corporation of New York No Drawing. Application August 2, 1947, Serial No. 765,804

3 Claims. (Cl. 252—351)

This invention relates to an improved inorganic emulsifying and suspending agent useful for the preparation of cosmetic, pharmaceutical and industrial suspensions and emulsions, for example, for the production of cold creams, vanishing creams, tooth paste, deodorants, antiperspirants, massage creams, sun-tan lotions, leg make-up, calomine preparations, automobile polishes, bases for perfume sticks, insecticides, crayons, deodorizing blocks, etc.

The product of the present invention is an inorganic, grit-free, water swellable, colloidal silicate of a composite nature, consisting of an admixture of the finely divided constituents of a magnesium bentonite, or saponite, which has a high gelation capacity, and aluminum bentonite or montmorillonite of high gelation capacity and an aluminum bentonite of medium or low gelation capacity. Each of these products is available in the form of a white material, such that the final product is white and, because of the relatively high opacity of the medium gel aluminum bentonite, has substantial opacity.

The product may be prepared in the form of a gel in water, containing, for example, 5% solids, or in the form of a dried product, for example, as small granules resulting from spray drying or as flakes resulting from drum drying of a suitable aqueous suspension. In either form, the product is odorless, tasteless, white in color, and free from organic material. It is readily dispersed in water or other media, and can be readily incorporated uniformly in cosmetic, pharmaceutical or industrial products. It does not exhibit the difficulties in dispersion which may be encountered in the use of simple high gelation capacity bentonites. The product has a high suspending or emulsifying capacity, a good rate of gelation, and forms gels, suspensions or emulsions which are relatively stable to changes in temperature.

In general, the compositions of the invention contain the fine, grit-free constituents corresponding to a mixture of the crude minerals containing from about 5 to 15% of the magnesium bentonite having a high gel capacity, from 20 to 60% of the aluminum bentonite or montmorillonite with the high gel capacity and from 30 to 70% of the aluminum bentonite with the medium or low gel capacity. The proportions of the fine constituents and coarse constituents in the crude materials differ. In typical products, about 50% of the solids of the magnesinum bentonite, about 40% of the solids of the high gel aluminum bentonite, and about 85% of the solids of the low gel bentonite are of fine particle size and are included in the product of the invention, the remainder being coarse and discarded. Thus, stated in terms of the solids present in the final product, it contains about 4 to 12% magnesium bentonite solids, 18 to 36% high gel aluminum bentonite solids, and 38 to 80% medium or low gel aluminum bentonite solids, all finely divided and grit-free.

The product is advantageously prepared by admixing the three materials, in a crude form, forming a suspension therefrom from the mixture in water, as by ball or pebble milling, and subjecting the resulting suspension to centrifuging to remove the coarse particles of silica and carbonate which are inherently present in the products as mined, irrespective of the degree of care used in selection.

A typical magnesium bentonite or saponite which may be used as the high gel magnesium bentonite constituent is the water swellable white clay found in the Mojave Desert near Hector, California. A typical sample of this product, as mined, has the following average chemical analysis:

| | Per cent |
|---|---|
| $SiO_2$ | 30.0 |
| $Al_2O_3$ | 0.5 |
| $Fe_2O_3$ | Tr. |
| $TiO_2$ | Tr. |
| $CaO$ | 28.0 |
| $MgO$ | 15.0 |
| $Na_2O$ | 2.0 |
| $K_2O$ | Tr. |
| F | 3.0 |
| Ignition loss | 21.5 |

It is white in color, and is a highly effective emulsifying agent.

A suitable aluminum bentonite or montmorillonite for use in producing the compositions of the invention is a white, water swellable aluminum bentonite found near Beatty, Nevada. This product is extremely white but has low opacity, is of high gel character and has high suspending powers. A typical product has the following average chemical composition:

| | Per cent |
|---|---|
| $SiO_2$ | 70.0 |
| $Al_2O_3$ | 20.0 |
| $Fe_2O_3$ | 2.0 |
| $TiO_2$ | Tr. |
| $CaO$ | Tr. |
| $MgO$ | 5.0 |
| $Na_2O$ | 1.0 |
| $K_2O$ | Tr. |
| F | Tr. |
| Ignition loss | 2.0 |

A suitable medium or low gel aluminum bentonite is a clay from the deposit on the edge of the Funeral Mountains just north of Death Valley Junction, California. This product has a medium gel capacity, is white and has high opacity. It serves in the composite compositions of the invention to improve the color and opacity and also to impart to the composition the property of being readily dispersed in or incorporated in the various types of preparations in which these inorganic dispersing, suspending or emulsifying agents are used. A typical product has the following chemical analysis:

|  | Per cent |
|---|---|
| $SiO_2$ | 70.0 |
| $Al_2O_3$ | 16.0 |
| $Fe_2O_3$ | Tr. |
| $TiO_2$ | Tr. |
| CaO | Tr. |
| MgO | 8.0 |
| $Na_2O$ | 2.0 |
| $K_2O$ | Tr. |
| F | Tr. |
| Ignition loss | 4.0 |

While in the foregoing description of the raw materials which are admixed to form the composite products of the invention reference has been made to them as magnesium or aluminum bentonites, it is to be understood that the terms as used are used with reference to the element of the swellable clay which is present in larger amount and presumably is responsible for the characteristics of the clay, and is not intended to indicate that the other element is not present. Thus, the magnesium bentonite contains some alumina, and the aluminum bentonite some magnesia as shown by the foregoing analyses.

In preparing the new products of the invention, the three types of clay selected, for example, as outlined above, are admixed in the selected ratio with water, and the resulting admixture is disintegrated rapidly in a ball mill or the like, which may be a batch or continuous mill. Advantageously, the quantity of water used is such that the admixture of water and the clays contains about 12% of solids but this may be varied, for example, from about 10 to 15% of solids. Treatment of the product for about 30 minutes in the ball mill gives optimum results, but a somewhat shorter period of disintegration or a longer period may be used if desired. The product from the ball mill consists of a suspension or dispersion of the clay in water, the dispersion containing all of the materials present in the three clays used.

This suspension or slurry is then subjected to centrifuging, as, for example, by feeding it to a solid basket centrifuge, which may either be a batch of continuous centrifuge, to separate the coarse particles, such as the coarse silica and carbonate particles present in the mixture, from the fine product which constitutes the product of the invention. Centrifuging at a centrifugal force of 1000 times gravity gives excellent results, and involves the separation of the feed to the centrifuge into two fractions usually of about equal solids content, the discard including substantially all of the coarse impurities and the recovered product containing the fine constituents in the form of a smooth, white paste.

This smooth white paste may be used as such, but advantageously is dried so that the product may be distributed in dry form, with consequent avoidance of the shipment of large proportions of water and with opportunity to use the product where the relatively large amount of water present in the aqueous paste is undesirable.

The aqueous material may be dried by spray drying, but is advantageously subjected to drum drying to give a finished dry product in the form of thin flakes, which may be ground to about 16 mesh for distribution. The drum drier is advantageously operated to give the product in the form of sheets or flakes about .005" to .01" thick. Disintegration of such a product to 16 mesh yields a material which is readily dispersible or suspendible in water, which is incorporated uniformly in the product in which it is to be used without difficulty, and which has the advantages for cosmetic, pharmaceutical and industrial emulsions, suspensions and the like, outlined above.

A particularly advantageous product is obtained by admixing 10% of the high gel magnesium bentonite, 45% of the high gel aluminum bentonite and 45% of the low gel aluminum bentonite described in detail above with enough water to give a suspension having 12% of solids, ball milling the product for 30 minutes, centrifuging the resulting product at 1000 g. in a standard solid basket centrifuge having a 10 gallon capacity at a feed rate of 3⅓ gallons per minute, with discard of about 40% of the solids and retention of about 60% of the solids in the end product and subjecting the product so obtained to drum drying.

If the product of the invention is distributed in the form of an aqueous suspension or paste, it may have with advantage a solids content of about 5%, although products with somewhat lower or higher solids content may be so distributed. Reduction of the solids content merely involves the distribution of substantially increased quantities of water, while increase in the solids content may give a product which is too stiff for easy handling.

In the foregoing description reference has been made to centrifuging of the crude admixture with removal of about 40% of the solids content initially present. It is to be understood that the purpose of this centrifuging is to remove the coarser particles which impart to the product a gritty or abrasive nature, and to insure that the final product consists substantially entirely of grit-free effective material. The amount of material separated from the crude product should be enough to insure the removal of the objectionable coarse particles, and this will be governed substantially by the quantity of the coarse gritty particles present in the raw materials. With carefully selected raw materials the quantity required to be removed may be less than 40%; with raw materials containing substantial proportions of silica and carbonate impurities more than 40% of the solids may be required to be removed to give a satisfactory product. The foregoing example is based upon operations conducted on typical products of the type described in detail above.

Also while in the foregoing description, the production of the composite product has been described using a procedure in which the crude materials are admixed, subjected to disintegration in admixture in a ball mill and subjected to centrifuging in admixture, it is to be understood that similar composite products may be obtained by separate treatment of the three constituents, that is, the dispersion of each of the raw materials in water separately, followed by their centrifuging separately to remove coarse particles, followed by admixture of the fine suspensions or gels obtained from the separate centrifuging operations. In general, it is advantageous to admix the crude materials, but composite products within the scope of the invention may be prepared by admixture of the separately centrifuged materials.

We claim:

1. An inorganic emulsifying, dispersing, and suspending agent consisting essentially of an intimate admixture of fine, grit-free constituents of a high gel magnesium bentonite, a high gel aluminum bentonite, and a medium gel aluminum bentonite in the proportions of 5 to 15 parts of the magnesium bentonite, 20 to 60 parts of the high gel aluminum bentonite and 30 to 70 parts of the medium gel aluminum bentonite, said admixture being free from particles sufficiently coarse to impart grittiness thereto.

2. The product of claim 1 in the form of dry flakes.

3. The product of claim 1, in which the proportions are 10 parts of the magnesium bentonite and 45 parts of each of the aluminum bentonites.

WILLIAM K. FEUSTEL.
FRANCIS E. HUTCHINS.

REFERENCES CITED

The following references are of record in the file of this patent:

UNITED STATES PATENTS

| Number | Name | Date |
|---|---|---|
| 1,788,706 | Cross | Jan. 13, 1931 |
| 1,933,977 | Harris | Nov. 7, 1933 |
| 1,943,532 | Howe | Jan. 16, 1934 |
| 2,409,338 | Acton | Oct. 15, 1946 |

OTHER REFERENCES

Reprint from Industrial Mineral and Rocks, Amer'n Institute of Mining and Metallurgical Engineers, 1937, chapter VI, Bentonite, by Paul Bechtner.